(12) United States Patent
Coldren et al.

(10) Patent No.: US 6,227,459 B1
(45) Date of Patent: May 8, 2001

(54) VALVE WITH SELF-CENTERING, SELF-SEALING SEAT COMPONENT

(75) Inventors: Dana R. Coldren, Fairbury; David E. Martin, Normal, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/366,025

(22) Filed: Aug. 2, 1999

(51) Int. Cl.[7] .................................................. F02M 47/02
(52) U.S. Cl. ........................ 239/88; 239/96; 239/533.9; 239/585.1
(58) Field of Search .................................. 239/88, 89, 96, 239/533.2, 533.8, 533.9, 585.1, 585.4, 585.5; 137/625.65, 625.67, 625.69, 627.5

(56) References Cited

U.S. PATENT DOCUMENTS

| | | |
|---|---|---|
| 3,802,626 | * 4/1974 | Regnealt et al. ........................ 239/96 |
| 5,218,999 | 6/1993 | Tanimoto . |
| 5,463,996 | * 11/1995 | Maley et al. ........................ 239/88 X |
| 5,626,326 | 5/1997 | Goossens . |
| 5,628,293 | 5/1997 | Gibson . |
| 5,673,669 | * 10/1997 | Maley et al. ........................ 239/96 X |
| 5,697,342 | * 12/1997 | Anderson et al. ................. 239/96 X |
| 5,947,380 | * 9/1999 | Coldren et al. ......................... 239/88 |
| 5,961,052 | * 10/1999 | Coldren et al. ................... 239/585.1 |
| 6,059,203 | 5/2000 | Streicher et al. . |

* cited by examiner

Primary Examiner—Lesley D. Morris
Assistant Examiner—Steven J. Ganey
(74) Attorney, Agent, or Firm—Liell & McNeil

(57) ABSTRACT

A valve comprises a valve body that includes an upper valve seat and a bore wall that defines a bore. A seat component is at least partially positioned in the bore and includes a lower valve seat. The seat component is radially out of contact with the bore wall. The upper valve seat and the lower valve seat are concentrically coupled via a valve member which is movable between the upper valve seat and the lower valve seat. The valve finds preferred application as a needle control valve in a fuel injector.

20 Claims, 3 Drawing Sheets

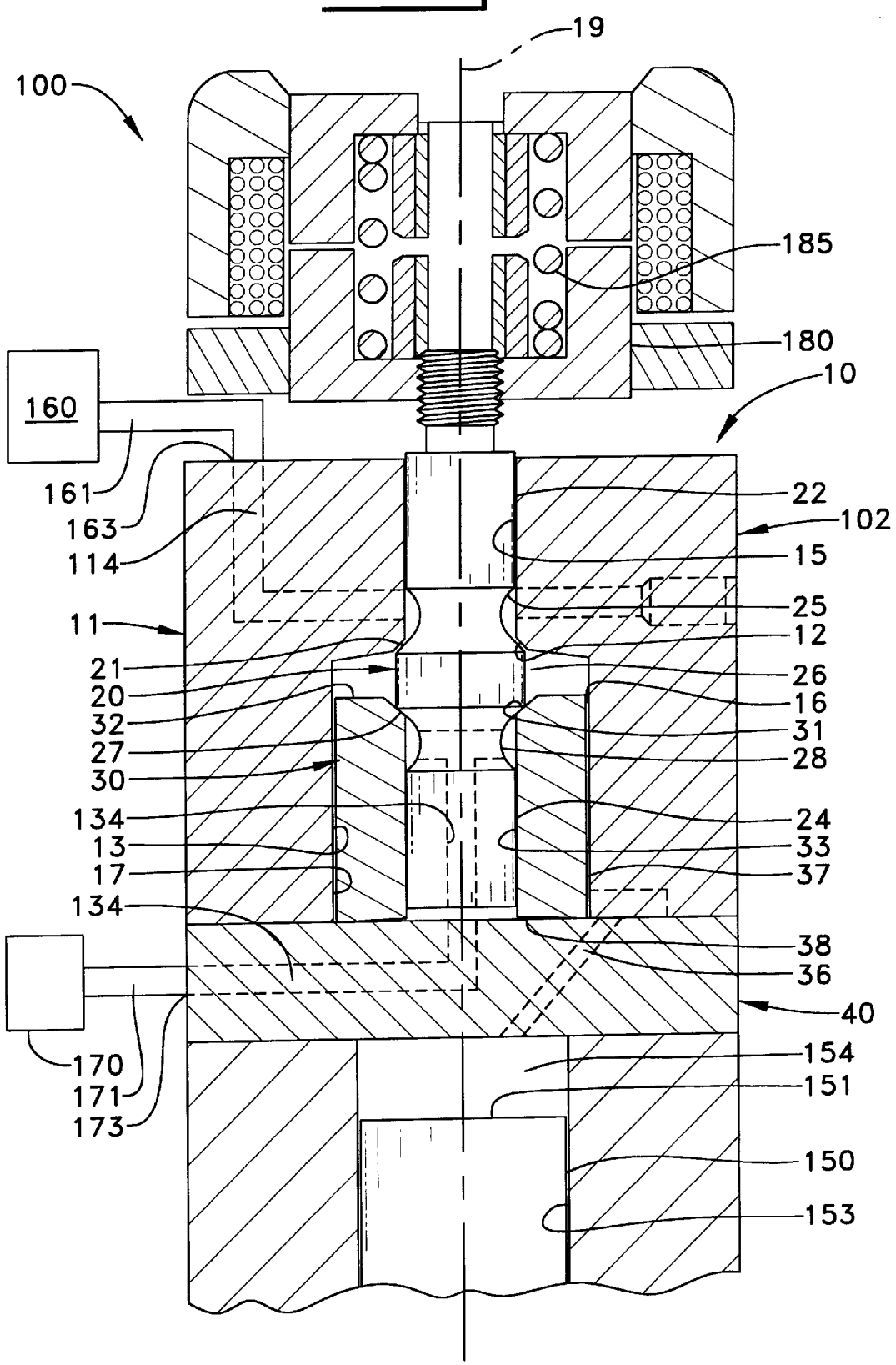

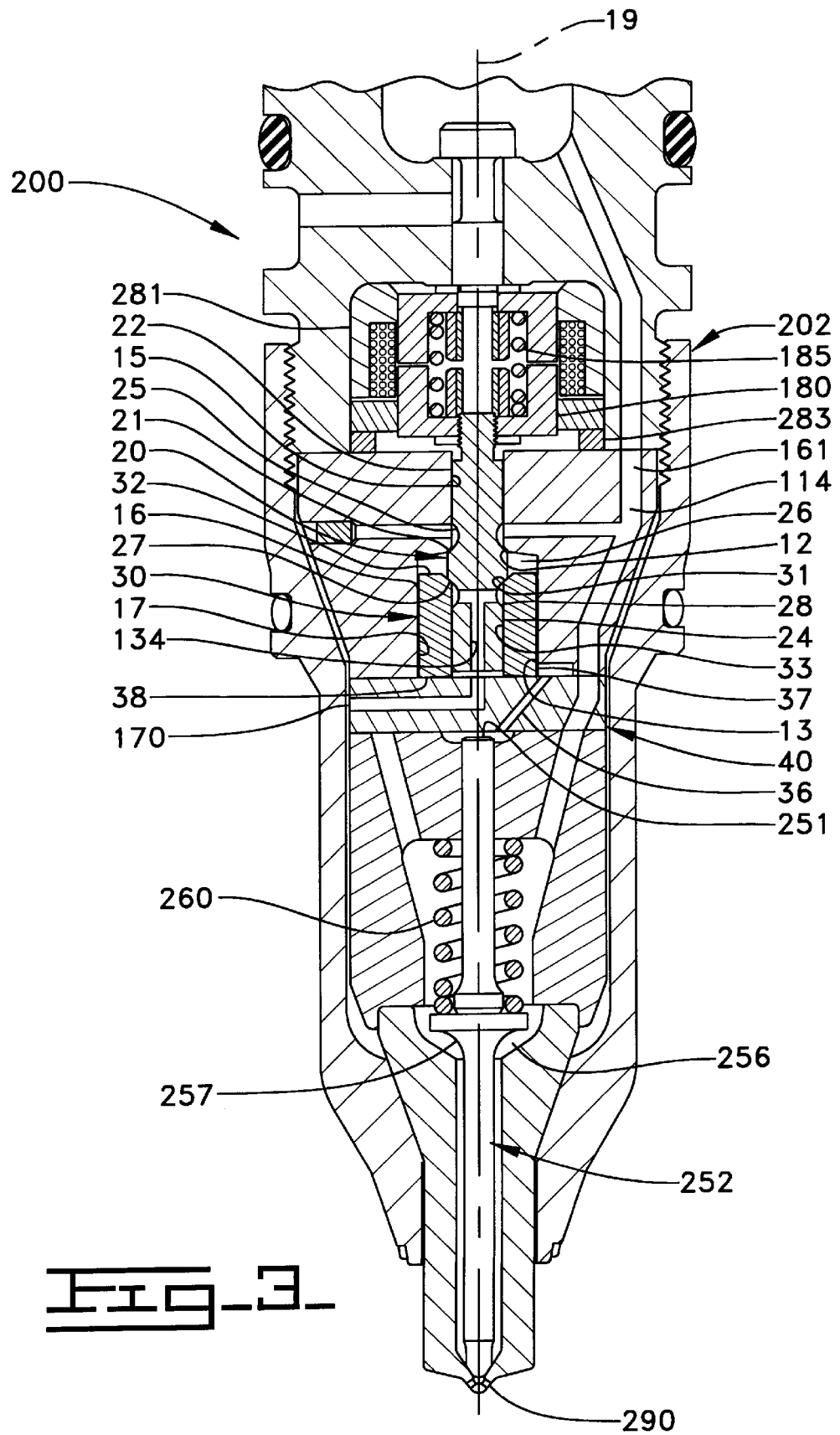
Fig_3

VALVE WITH SELF-CENTERING, SELF-SEALING SEAT COMPONENT

TECHNICAL FIELD

This invention relates generally to valves having guided valve members, and more particularly to valves having valve members trapped between opposing valve seats.

BACKGROUND ART

A number of valves have been developed which include a valve member movably positioned in a valve body. In all of these previous valves, three components have been necessary to define the four essential valve surfaces and valve seats. In these valves, a valve member, which defined the two valve surfaces, was trapped between a first valve seat defined by the main valve body, and a second valve seat which was located by its contact with the main valve body, such as a press fit or a sleeve. For proper valve performance, all of these valve surface and valve seats must be concentrically aligned. Past valves which have had some success concentrically aligning these surfaces and seats have included the second seat on a seat component which remained radially in contact with the main valve body. While some machining tolerance of the various valve features must always exist, engineers are always looking for a way to improve the concentricity of these components.

The present invention is directed to overcoming one or more of the problems described above and to improving opposing valve surface/seat alignments.

SUMMARY OF THE INVENTION

A valve comprises a valve body that includes an upper valve seat and a bore wall that defines a bore. A seat component is at least partially positioned in the bore and includes a lower valve seat. The seat component is radially out of contact with the bore wall. The upper valve seat and the lower valve seat are concentrically coupled via a valve member which is movable between the upper valve seat and the lower valve seat.

BRIEF DESCRIPTION OF THE DRAWINGS

FIG. 2 is a diagrammatic sectioned front view of a hydraulically controlled device according to the present invention.

FIG. 3 is a partial diagrammatic sectioned front view of a fuel injector according to the present invention.

BEST MODE FOR CARRYING OUT THE INVENTION

Figure 1:
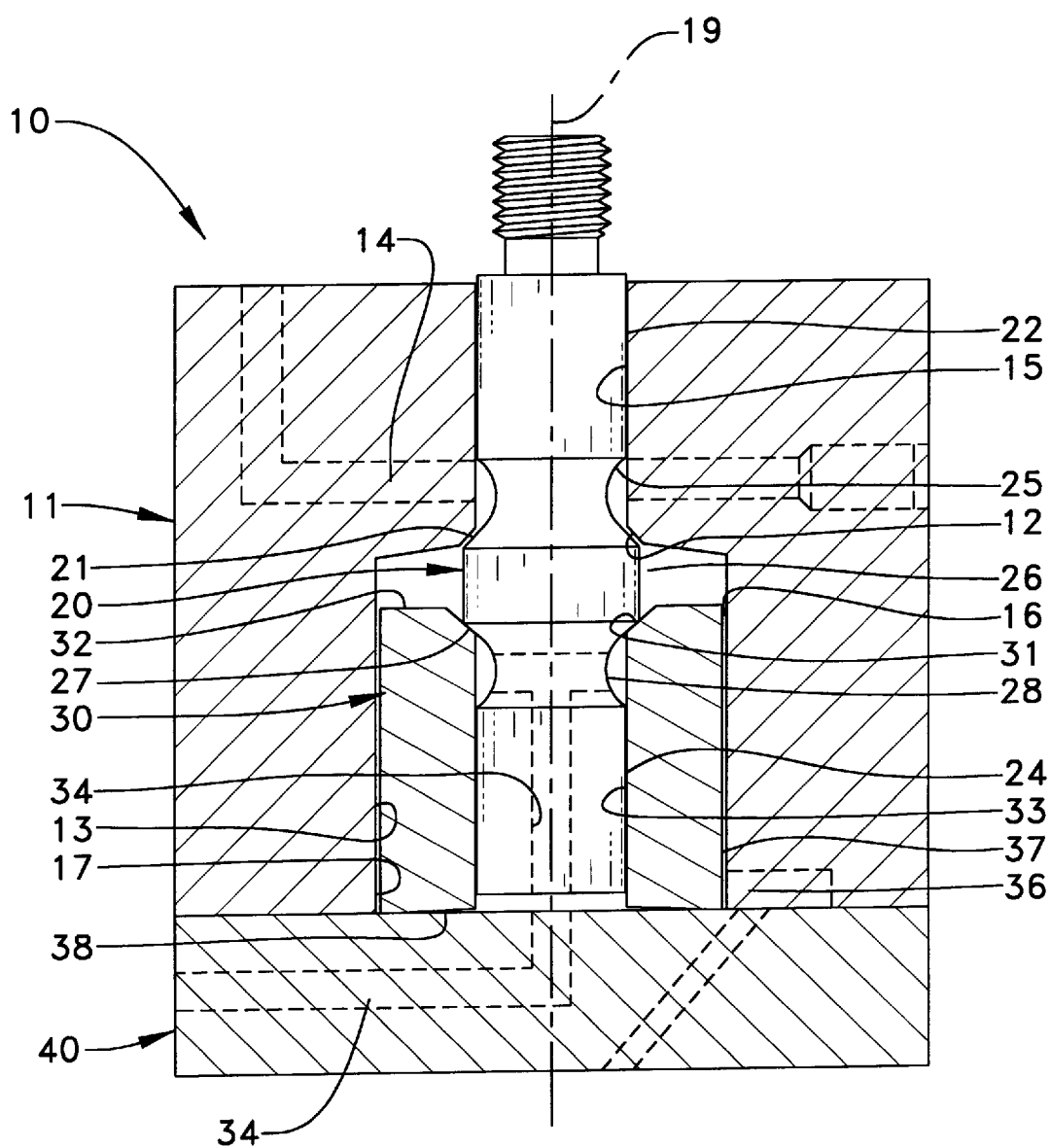
FIG. 1 is a diagrammatic sectioned front view of a valve according to the present invention.

Referring now to FIG. 1, there is shown a diagrammatic sectioned front view of a valve 10 according to the present invention. Valve 10 includes a valve body 11 and a lower body component 40. Valve body 11 includes an upper valve seat 12 and a bore wall 13 which defines a bore 17. A seat component 30 is positioned within bore 17 and includes a lower valve seat 31, a top surface 32 and a bottom surface 38. Seat component 30 is radially out of contact with bore wall 13 such that a clearance area 16 exists between seat component 30 and valve body 11. While seat component 30 has been shown as a sleeve, other geometric representations could be substituted so long as clearance area 16 exists between an outside diameter 37 of seat component 30 and bore wall 13 of valve member 11 over the entire circumference of bore 17. Valve 10 also includes a valve member 20 that shares a centerline 19 with valve body 11 and seat component 30. Valve member 20 includes an upper guide surface 22 which is guided in an upper guide bore 15 defined by valve body 11, and a lower guide surface 24 which is guided in a lower guide bore 33 defined by seat component 30. Valve member 20 is moveable between upper valve seat 12 and lower valve seat 31.

A control volume 26 is located between upper valve seat 12 and lower valve seat 31 and is defined by valve member 20, valve body 11 and top surface 32. Control volume 26 is open to a control passage 36 which is defined by valve body 11, lower body component 40 and seat component 30. A portion of control passage 36 is preferably, but not necessarily, clearance area 16. Depending on the position of valve member 20, control volume 26 is alternately open to either a first fluid passage 14 or a second fluid passage 34. First fluid passage 14 is preferably defined by valve body 11 and an upper annulus 25 located on valve member 20. Second fluid passage 34 is preferably defined by seat component 30, lower body component 40 and a lower annulus 28 located on valve member 20. Second fluid passage 34 preferably passes through bottom surface 38. When valve member 20 is in an upper position, an upper valve surface 21 of valve member 20 is in contact with upper valve seat 12, and control volume 26 is closed from fluid communication with first fluid passage 14, but fluidly connected to second fluid passage 34. Conversely, when valve member 20 is in a lower position, a lower valve surface 27 of valve member 20 is in contact with lower valve seat 31, and control volume 26 is closed from fluid communication with second fluid passage 34, but fluidly connected to first fluid passage 14.

Upper guide surface 22, lower guide surface 24, upper valve surface 21 and lower valve surface 27 should be machined in a single chucking to maintain concentricity between these elements. By machining valve member 20 in this manner, valve member 20 can concentrically couple upper valve seat 12 and lower valve seat 31. Because valve member 20 is responsible for concentrically coupling upper valve seat 12 of valve body 11 and lower valve seat 31 of seat component 30 about centerline 19, seat component 30 is able to move up and down within bore 17. Therefore, recall that clearance area 16 should be defined to allow seat component 30 to remain radially out of contact with valve wall 13.

Seat component 30 should be machined such that lower valve seat 31 and lower guide bore 33 are machined in a single chucking to maintain concentricity of these elements. Depending on the desired clearance area 16, outer surface 37 can be machined in the same chucking as lower valve seat 31 and lower guide bore 33 as well. While top surface 32 of seat component 30 need not be machined to a tight tolerance, it is essential that bottom surface 38 of seat component 30 seal lower body component 40 at outside diameter 37. To achieve this sealing, bottom surface 38 is preferably a concave or beveled surface. While this shape is preferable, however, it should be appreciated that other bottom surface shapes, such as planar, could be used to achieve sufficient sealing. Further, for adequate sealing, outside diameter 37 at bottom surface 38 should lie in a plane substantially perpendicular to centerline 19.

Referring now to FIG. 2, there is shown a valve according to the present invention as incorporated into a hydraulically actuated device 100. With minor modifications to valve 10 shown in FIG. 1, the FIG. 2 embodiment could be incorporated into a device body 102 to make a complete hydraulically actuated device 100. Therefore, a detailed description of like components of valve 10 will not be repeated.

A piston 150 is positioned within device body 102 to be moveable within a piston bore 153 between an upward position and a downward position. Piston 150 includes a hydraulic surface 151 that is exposed to fluid pressure in a pressure cavity 154 which is defined by piston bore 153 and piston 150. Pressure cavity 154 is in fluid communication with control volume 26 via control passage 36. As with valve 10 (FIG. 1), control volume 26 is alternately exposed to a first fluid passage and a second fluid passage. However, in this embodiment, first fluid passage 14 is a high pressure passage 114 which is fluidly connected to a source of high pressure 160 via a high pressure supply passage 161 and a high pressure inlet 163. Similarly, second fluid passage 34 is a low pressure passage 134 that is fluidly connected to a low pressure reservoir 170 via a low pressure drain passage 171 and a low pressure drain 173.

Valve member 20 is operably connected to a biasing spring 185 and an electronic actuator 180. When electronic actuator 180 is de-energized, the force of biasing spring 185 acts to bias valve member 20 to a downward position in which control volume 26 is fluidly connected to high pressure passage 114 and closed from fluid communication with low pressure passage 134. When valve member 20 is in the downward position, pressure cavity 154 is exposed to high pressure in control volume 26 via control passage 36. Exposure of hydraulic surface 151 to this high pressure moves piston 151 downward within piston bore 153 to do work. When electronic actuator 180 is energized, valve member 20 is moved against the force of biasing spring 180 to an upward position in which control volume 26 is fluidly connected to low pressure passage 134 and closed from fluid communication with high pressure passage 114. When valve member 20 is in the upward position, fluid contained in control volume 26 and pressure cavity 154 can flow into low pressure reservoir 170 via low pressure passage 173 and low pressure drain passage 171. Relief of high pressure exerted on hydraulic surface 151 enables piston 150 to return to its upward position for a subsequent work event.

Recall from the description of the FIG. 1 embodiment adequate sealing of bottom surface 38 and outside diameter 37 requires that outside diameter 37 lie in a plane perpendicular to centerline 19. In the FIG. 2 embodiment, the necessity of this perpendicularity can be more easily seen. Bottom surface 38 is always exposed to low pressure via low pressure passage 34. When valve member 20 moves toward its upward position, it is possible for seat component 30 to move upward in a corresponding manner. When electronic actuator 180 is de-energized and valve member 20 is allowed to return to its downward position under the force of biasing spring 185, seat component 30 must be returned to its downward position by the force of high pressure fluid entering control volume 26 to allow bottom surface 38 to seal outside diameter 37. If bottom surface 38 does not seal outside diameter 37, high pressure fluid can flow under seat component 30. Exposing bottom surface 38 to high pressure would prevent seat component from returning to its downward position and further prevent valve 10 from proper function. For this reason, those skilled in the art should appreciate that insertion of a spring into control volume 26 to bias seat component 30 downward could be beneficial.

Referring now to FIG. 3, there is shown a valve according to the present invention as incorporated into a fuel injector 200. With minor modifications to valve 110 shown in FIG. 2, the FIG. 3 embodiment could be incorporated into an injector body 202 to make a complete fuel injector 200 with a direct control needle valve. Therefore, a detailed description of like components of valve 110 will not be repeated.

Fuel injector 200 includes an electronic actuator 180 which is preferably a solenoid 281. While electronic actuator 180 has been shown as solenoid 281, it should be appreciated that another suitable device, such as a piezoelectric actuator could be substituted. Solenoid 281 includes an armature 283 which is operably connected to valve member 20. Fuel injector 200 also includes a nozzle outlet 290 and a direct control needle valve member 252 which is movably mounted in injector body 202 between an upward position, in which nozzle outlet 290 is open, and a downward position in which nozzle outlet 290 is blocked. Needle valve member 252 includes a closing hydraulic surface 251 which is exposed to fluid pressure in control volume 26 via control passage 36 and an opening hydraulic surface 257 that is exposed to fluid pressure in a nozzle chamber 256.

When solenoid 281 is de-energized, valve member 20 is biased to a downward position by biasing spring 180 to fluidly connect control volume 26 with high pressure passage 114 and correspondingly close it from fluid communication with low pressure passage 134. In this embodiment pressure source 160 has been replaced by a conventional means of pressurizing fuel within fuel injector 200. When valve member 20 is in the downward position, hydraulic surface 251 is exposed to high pressure in control volume 26 via control passage 36 and opening hydraulic surface 257 is exposed to high pressure fuel in nozzle chamber 256. Because needle valve member 252 is a direct control needle valve member, it will remain in the downward closed position until pressure exerted on opening hydraulic surface 257 reaches a valve opening pressure which is defined by the strength of a spring 260. Therefore, hydraulic surface 251, opening hydraulic surface 257 and control passage 36 should be sized such that a valve opening pressure will not be reached, and needle valve member 252 will remain in the downward closed position, when high pressure is acting on both hydraulic surface 251 and opening hydraulic surface 257.

When solenoid 281 is energized, armature 283 acts against the force of biasing spring 185 to pull valve member 20 to an upward position in which control volume 26 is open to fluid communication with low pressure passage 134 and closed from fluid communication with high pressure passage 114. When valve member 20 is in this position, fuel contained in control volume 26 can flow out of fuel injector 200 into low pressure reservoir 170 via low pressure passage 173 and the pressure exerted on hydraulic surface 251 is relieved. When the pressure exerted on hydraulic surface 251 is relieved, the force acting on opening hydraulic surface 257 is sufficient to move needle valve member 252 to the upward position to open nozzle outlet 290.

INDUSTRIAL APPLICABILITY

Referring now to the FIG. 2 embodiment of the present invention, when electronic actuator 180 is de-energized, biasing spring 185 biases valve member 20 to the downward position and control volume 26 is open to high pressure passage 114. High pressure fluid flows through control volume 26 into pressure cavity 154 via control passage 36. Once hydraulic surface 151 is exposed to high pressure, piston 150 begins to move to the downward position within piston bore 153. When electronic actuator 180 is energized, valve member 20 is moved to its upward position and control volume 26 is closed from fluid communication with high pressure passage 114 and fluidly connected to low pressure passage 134. Fluid in control volume 26, control passage 36, and pressure cavity 154 flows into low pressure reservoir 170 via low pressure drain 173 and low pressure drain passage 171.

Referring now to the FIG. 3 embodiment of the present invention, prior to the start of an injection event, solenoid 281 is de-energized, valve member 20 is in its downward position, control volume 26 is fluidly connected to high pressure passage 114, hydraulic surface 251 is exposed to high pressure in control volume 26 via control passage 36, opening hydraulic surface 257 is exposed to fuel pressure in nozzle control chamber 256 and needle valve member 252 is in the downward position closing nozzle outlet 290. An injection event begins when solenoid 281 is energized and valve member 20 is pulled to its upward position by armature 283. When valve member 20 is moved to its upward position, control volume 26 is fluidly connected to low pressure passage 134 and high pressure fuel can flow into low pressure reservoir 170 via low pressure drain 173. Once the pressure exerted on hydraulic surface 251 is relieved, the fuel pressure in nozzle chamber 155 is sufficient to lift opening hydraulic surface 257 thus moving needle valve member 252 to the upward position to open nozzle outlet 290 and commence fuel spray into the combustion chamber.

Shortly before the desired amount of fuel has been injected, a signal is sent to solenoid 281 to end the injection event. Solenoid 281 is de-energized and valve member 20 moves to its downward position under the force of biasing spring 185. The downward movement of valve member 20 closes control volume 26 from fluid communication with low pressure passage 134 and fluidly connects it to high pressure passage 114. Hydraulic surface 251 is once again exposed to high pressure in control volume 26 and fuel pressure within nozzle chamber 255 is no longer sufficient to maintain needle valve member in an upward position. Needle valve member 252 returns to the downward position to close nozzle outlet 290 and fuel spray into the combustion chamber is ended.

The present invention is better able than previous valves to maintain alignment of the valve surfaces on valve member 20 with the corresponding valve seats. Because seat component 30 is decoupled from machining of upper valve seat 12, valve member 20 is better able to concentrically couple upper valve seat 12 and lower valve seat 31. This decoupling of seat component 30 allows the present invention to encounter fewer problems associated with valve member misalignment than previous valves that relied on a sleeve member in contact with the main valve body for guidance such as damage to internal components of valve 10 or interrupted flow around valve member 20.

It should be understood that the above description is intended only to illustrate the concepts of the present invention, and is not intended to in any way limit the potential scope of the present invention. For instance, it should be appreciated that the solenoid and spring forces exerted on the valve could be reversed in the hydraulic device and fuel injector embodiments. Further, while the control passage has been shown opening into the clearance area between the sleeve and the valve body, it could open anywhere in the valve that would allow it to connect to the control volume. Additionally, a spring could be added in the control volume to bias the seat component to a downward position to aid the sealing of the bottom surface at the outside diameter. Thus, various modifications could be made without departing from the intended spirit and scope of the invention as defined by the claims below.

What is claimed is:

1. A valve comprising:

a valve body including a lower body component, an upper valve seat and a bore wall that defines a bore;

a seat component at least partially positioned in said bore and being radially out of contact with said bore wall, said seat component including a lower valve seat and a bottom surface;

said upper valve seat and said lower valve seat being concentrically coupled via a valve member moveable between said upper valve seat and said lower valve seat and said bottom surface including a valve surface in contact with a flat valve seat included on said lower valve body.

2. The valve of claim 1 wherein said valve member, said valve body and said seat component define a control volume located between said upper valve seat and said lower valve seat;

a first fluid passage is defined at least in part by said valve body and open to said control volume when said valve member is out of contact with said upper valve seat; and a second fluid passage is defined in part by said seat component and said valve member and open to said control volume when said valve member is out of contact with said lower valve seat.

3. The valve of claim 1 wherein said lower body component defines a portion of a fluid passage.

4. The valve of claim 1 wherein said seat component includes a top surface which at least partially defines a control volume; and a fluid passage passes through said bottom surface of said seat component.

5. The valve of claim 1 wherein said bottom surface is a concave surface; and a fluid passage passes through said bottom surface of said seat component.

6. The valve of claim 1 wherein a control passage is defined by said valve body, said lower body component and said seat component; and a portion of said control passage is a clearance area between said seat component and said valve body.

7. The valve of claim 1 wherein said seat component and said valve member define a fluid passage, a portion of said fluid passage at least partially positioned within an outside diameter of said seat component.

8. The valve of claim 1 wherein said valve body defines an upper guide bore;

said seat component defines a lower guide bore; and said valve member includes an upper guide surface guided in said upper guide bore and a lower guide surface guided in said lower guide bore.

9. A hydraulically actuated device comprising:

a hydraulically actuated piston including a hydraulic surface exposed to fluid pressure in a control passage;

a control valve including a valve body, said valve body defining an upper valve seat and including a lower body component and a bore wall that defines a bore;

a high pressure passage defined at least in part by said control valve and being fluidly connected to a high pressure source;

a low pressure passage defined at least in part by a lower body component and being fluidly connected to a low pressure reservoir;

a seat component at least partially positioned in said bore and being radially out of contact with said bore wall, said seat component including a lower valve seat and a bottom surface;

said upper valve seat and said lower valve seat being concentrically coupled via a valve member moveable between said upper valve seat and said lower valve seat and said bottom surface including a valve surface in contact with a flat valve seat included on said lower valve body.

10. The hydraulically actuated device of claim 9 wherein said valve member, said valve body and said seat component define a control volume located between said upper valve seat and said lower valve seat;

said high pressure passage is open to said control volume when said valve member is out of contact with said upper valve seat; and said low pressure passage is open to said control volume when said valve member is out of contact with said lower valve seat.

11. The hydraulically actuated device of claim 10 wherein said seat component includes a top surface which partially defines said control volume; and said low pressure passage passes through said bottom surface of said seat component.

12. The hydraulically actuated device of claim 11 wherein said bottom surface is a concave surface.

13. The hydraulically actuated device of claim 12 wherein said valve body defines an upper guide bore;

said seat component defines a lower guide bore; and said valve member includes an upper guide surface guided in said upper guide bore and a lower guide surface guided in said lower guide bore.

14. The hydraulically actuated device of claim 13 wherein said control passage is defined in part by a clearance area located between said seat component and said valve body.

15. A fuel injector comprising:

an injector body including a valve body, a seat component and a lower body component and defining a high pressure passage and a low pressure passage;

a needle valve member being positioned in said injector body and including a hydraulic surface exposed to fluid pressure in a control passage;

said valve body defining an upper valve seat and including a bore wall that defines a bore;

said seat component at least partially positioned in said bore and being radially out of contact with said bore wall, said seat component including a lower valve seat and a bottom surface;

said upper valve seat and said lower valve seat being concentrically coupled via a valve member moveable between said upper valve seat and said lower valve seat and said low pressure passage passing through said bottom surface.

16. The fuel injector of claim 15 wherein said valve member, said valve body and said seat component define a control volume located between said upper valve seat and said lower valve seat, said control volume being open to said control passage;

said high pressure passage is open to said control volume when said valve member is out of contact with said upper valve seat; and said low pressure passage is open to said control volume when said valve member is out of contact with said lower valve seat.

17. The fuel injector of claim 16 wherein a portion of said control passage is a clearance area between said seat component and said valve body.

18. The fuel injector of claim 17 wherein said bottom surface is a concave surface; and said bottom surface is in contact with a flat valve seat included on said lower body component.

19. The fuel injector of claim 18 wherein said valve body defines an upper guide bore;

said seat component defines a lower guide bore; and said valve member includes an upper guide surface guided in said upper guide bore and a lower guide surface guided in said lower guide bore.

20. The fuel injector of claim 19 wherein said injector body includes a nozzle supply passage;

said high pressure passage being fluidly connected to said nozzle supply passage;

said injector body includes a fuel supply passage; and said low pressure passage being fluidly connected to said fuel supply passage.

* * * * *